(12) United States Patent
Fricke et al.

(10) Patent No.: US 11,078,974 B2
(45) Date of Patent: Aug. 3, 2021

(54) DISC BRAKE FOR A COMMERCIAL VEHICLE

(71) Applicant: KNORR-BREMSE Systeme fuer Nutzfahrzeuge GmbH, Munich (DE)

(72) Inventors: Jens Fricke, Vilshofen (DE); Werner Koch, Deggingen (DE); Robert Theil, Tuerkenfeld (DE); Andreas Petschke, Neuburg am Inn (DE); Wolfgang Pahle, Bad Wiessee (DE); Tobias Schoefberger, Mainburg (DE); Alexander Werth, Munich (DE); Matthias Adelung, Fuerstenzell (DE); Markus Gerhardinger, Kuenzing (DE); Julian Dahlenburg, Georgensgmuend (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 257 days.

(21) Appl. No.: 15/948,710

(22) Filed: Apr. 9, 2018

(65) Prior Publication Data
US 2018/0223922 A1    Aug. 9, 2018

Related U.S. Application Data

(63) Continuation of application No. PCT/EP2016/074154, filed on Oct. 10, 2016.

(30) Foreign Application Priority Data

Oct. 9, 2015    (DE) .................. 10 2015 117 285

(51) Int. Cl.
*F16D 55/22*    (2006.01)
*F16D 55/226*    (2006.01)
(Continued)

(52) U.S. Cl.
CPC ......... *F16D 55/226* (2013.01); *F16D 55/224* (2013.01); *F16D 65/0056* (2013.01);
(Continued)

(58) Field of Classification Search
CPC .. F16D 55/226; F16D 55/224; F16D 65/0056; F16D 65/092; F16D 65/095;
(Continued)

(56) References Cited

U.S. PATENT DOCUMENTS 3,285,371 A    11/1966 Cadiou
4,068,743 A *  1/1978 Karasudani ........... F16D 55/227
                                                     188/18 A
(Continued)

FOREIGN PATENT DOCUMENTS

CN    1133082 A    10/1996
CN    1440495 A    9/2003
(Continued)

OTHER PUBLICATIONS

Chinese-language Office Action issued in counterpart Chinese Application No. 201680069863.1 dated Mar. 5, 2019 with English translation (10 pages).
(Continued)

*Primary Examiner* — Melanie Torres Williams
(74) *Attorney, Agent, or Firm* — Crowell & Moring LLP (57) ABSTRACT

A disc brake and a brake lining for a commercial vehicle are provided. The disc brake includes a brake caliper on a stationary brake carrier and straddling a brake disc. The brake carrier has at least one brake lining space, in particular two brake lining spaces, each of which is delimited by lateral brake carrier lugs and accommodates a brake lining. At least one respective dimensionally stable blocking element is provided as a counter bearing against the insertion direction of the brake pads. The blocking elements are supported on
(Continued)

the brake pads and/or or the brake carrier and are held on the brake carrier and/or on the brake pads.

14 Claims, 9 Drawing Sheets

(51) Int. Cl.
  *F16D 65/18* (2006.01)
  *F16D 65/00* (2006.01)
  *F16D 65/097* (2006.01)
  *F16D 55/224* (2006.01)
  *F16D 65/092* (2006.01)
  *F16D 65/095* (2006.01)
  *F16D 55/00* (2006.01)

(52) U.S. Cl.
  CPC ......... *F16D 65/092* (2013.01); *F16D 65/095* (2013.01); *F16D 65/097* (2013.01); *F16D 65/0974* (2013.01); *F16D 65/0978* (2013.01); *F16D 65/183* (2013.01); *F16D 2055/0008* (2013.01); *F16D 2055/0029* (2013.01)

(58) Field of Classification Search
  CPC ............... F16D 65/097; F16D 65/0974; F16D 65/0978; F16D 65/183
  See application file for complete search history.

(56) References Cited

U.S. PATENT DOCUMENTS

| | | | |
|---|---|---|---|
| 5,568,845 A | 10/1996 | Baumgartner et al. | |
| 5,577,577 A * | 11/1996 | Hirai | F16D 55/22 188/73.36 |
| 9,097,304 B2 | 8/2015 | Plantan et al. | |
| 2004/0099493 A1 | 5/2004 | Himmelsbach et al. | |
| 2006/0054430 A1 | 3/2006 | Maehara | |
| 2007/0261927 A1 | 11/2007 | Iraschko et al. | |
| 2009/0211857 A1 | 8/2009 | Camilo-Martinez et al. | |
| 2013/0240311 A1 * | 9/2013 | Camilo-Martinez | F16D 65/092 188/251 R |
| 2014/0131148 A1 | 5/2014 | Plantan et al. | |
| 2014/0326548 A1 * | 11/2014 | Merrien | F16D 65/0978 188/73.38 |
| 2015/0101897 A1 | 4/2015 | Derouault et al. | |
| 2015/0192180 A1 | 7/2015 | Kloos | |
| 2016/0160946 A1 | 6/2016 | Graaf et al. | |

FOREIGN PATENT DOCUMENTS

| | | | | |
|---|---|---|---|---|
| CN | 1749592 A | 3/2006 | | |
| CN | 101932846 A | 12/2010 | | |
| CN | 203604502 U | 5/2014 | | |
| CN | 104507770 A | 4/2015 | | |
| CN | 104508315 A | 4/2015 | | |
| DE | 40 20 287 A1 | 1/1992 | | |
| DE | 94 22 342 U1 | 4/2000 | | |
| DE | 10 2006 036 277 A1 | 2/2008 | | |
| DE | 10 2008 019 265 A1 | 10/2009 | | |
| DE | 10 2010 023 143 A1 | 12/2011 | | |
| DE | 102010023143 A1 * | 12/2011 | ......... | F16D 65/0978 |
| DE | 10 2013 101 781 A1 | 5/2014 | | |
| DE | 10 2013 013 687 A1 | 2/2015 | | |
| EP | 0 534 987 B1 | 8/1994 | | |
| SE | 342 298 B | 1/1972 | | |
| WO | WO 2006/048267 A1 | 5/2006 | | |
| WO | WO 2015/022080 A1 | 2/2015 | | |

OTHER PUBLICATIONS

International Search Report (PCT/ISA/210) Issued in International PCT Application No. PCT/EP2016/074154 dated Feb. 1, 2017, with English Translation (eight (8) pages).
German-language Written Opinion (PCT/ISA/237) issued in PCT International PCT Application No. PCT/EP2016/074154 dated Feb. 1, 2017 (seven (7) pages).
International Preliminary Report on Patentability (PCT/IB/326 & PCT/IB/373) issued in PCT Application No. PCT/EP2016/074154 dated Apr. 19, 2018 , including English translation of document C2 (German-language Written Opinion (PCT/ISA/237) previously filed on Apr. 9, 2017) (nine (9) pages).
Chinese-language Office Action issued in Chinese Application No. 201910766339.5 dated May 21, 2020 with English translation (14 pages).
Chinese language Office Action issued in Chinese Application No. 20191076639.5 dated Dec. 23, 2020 with English translation (12 pages).

* cited by examiner

DISC BRAKE FOR A COMMERCIAL VEHICLE

CROSS REFERENCE TO RELATED APPLICATIONS

This application is a continuation of PCT International Application No. PCT/EP2016/074154, filed Oct. 10, 2016, which claims priority under 35 U.S.C. § 119 from German Patent Application No. 10 2015 117 285.2, filed Oct. 9, 2015, the entire disclosures of which are herein expressly incorporated by reference.

BACKGROUND AND SUMMARY OF THE INVENTION

The invention relates to a disc brake for a utility vehicle, and to a brake lining for a disc brake.

In order to securely position the brake linings of such a disc brake which is known from the prior art, the brake linings are each provided with a lining securing spring, which lining securing springs are attached to the brake linings in the upper edge region facing an insertion opening of the lining spaces of the brake carrier.

With respect to this reference is made, for example, to DE 94 22 342 U1 and to DE 40 20 287 A1, in each of which a disc brake is disclosed which has proven itself, in particular even under the often rough operating conditions to which disc brakes in utility vehicles are subjected.

The brake linings are pressed with pretension, into the respective lining space of the positionally fixed brake carrier by a lining securing hoop which extends transversely with respect to the lining securing springs, that is to say in the axial direction of the brake disc, and is supported on the lining securing springs. In this context, the lining securing hoop is secured in two regions of the brake caliper which lie opposite one another and bound a mounting opening in the brake caliper.

The support of the brake linings under spring stress serves both to compensate tolerances and to reduce or prevent the production of rattling noises such as would otherwise occur during the driving mode of the vehicle.

In order to mount and dismount the lining securing hoop simply, it is, on the one hand, plugged into a pocket-shaped receptacle in the brake caliper and, on the other hand, attached to the brake caliper by a securing bolt, a washer and a pin, wherein the securing bolt which is supported on the lining securing hoop is guided through an attachment eyelet formed on the brake caliper, and said attachment eyelet passes through a window opening in the lining securing hoop.

The multiplicity of necessary individual parts by which the lining securing hoop is attached to the brake caliper is possible only with relatively large fabrication effort and mounting effort, which gives rise to correspondingly high costs and runs counter to the constant requirement for cost optimization.

This relates equally to a different known type of attachment of the lining securing hoop in which said hoop is screwed to the brake caliper. For this purpose, a threaded bore must be made in the brake caliper, which is, of course, relatively costly to execute.

Furthermore, there is in principle the risk that the attachment element, specifically the pin, becomes detached and, in particular, is lost during the driving operation, as is then also the securing bolt which is then no longer secured, with the result that the lining securing hoop can no longer perform its function, resulting in failure of the disc brake.

The further disadvantage of this known disc brake is the integral forming of the pocket-shaped receptacle and of the attachment eyelet, which eyelet is formed integrally with the brake caliper which is manufactured from cast iron. Owing to fabrication-related tolerances, which can cause the lining securing hoop not to be secured to the brake caliper with the desired precision, it is possible, despite the lining securing springs, for unsprung radial movement of the brake linings to occur, with the result that the purpose of the brake lining securing device, specifically of reliably avoiding rattling noise, cannot be fulfilled, or at least cannot be ensured.

It has therefore already been proposed many times to provide in the region of the lining spaces, in particular on their base, spring elements on which the brake linings are supported. In WO 2006/048267 A1 there is provision to arrange spring elements in the form of leaf springs or limb springs in order to compensate tolerances between a lining carrier plate and the lining space.

DE 10 2006 036 277 A1 describes a disc brake in which spring elements can be provided on the base of the respective lining space, on which spring elements the lining shaft rests with the result that it is held suspended in the radial direction when not in use.

The invention is based on the object of developing a disc brake of the generic type in such a way that its operational reliability is improved and its manufacturing and mounting costs are lowered.

By virtue of the inventive configuration of the disc brake it is possible to dispense with the use of lining securing springs, and accordingly with a lining securing hoop. As a result, in the first instance the manufacture of the brake caliper is significantly simplified since securing features (such as the pocket which was mentioned with respect to the prior art and which accommodates the lining securing hoop and the eyelet which serves to attach a securing element) no longer have to be formed.

Apart from the fact that as a result there is, of course, a cost saving as well as moreover as a result of dispensing with the lining securing hoop overall, owing to the tolerance fluctuations which no longer have to be taken into account, there are no resulting incorrect adjustments of the brake linings.

The disadvantages described with respect to the prior art when releasing the securing of the lining securing hoop on the brake caliper, and the resulting risks with respect to restriction of the operational reliability, now no longer occur, which is significant, in particular, in so far as disc brakes constitute safety-relevant functional parts.

According to the invention, dimensionally stable locking elements are provided which form counter bearings for the brake linings which are under spring pressure in the direction of the insertion opening of the lining spaces.

In this context, each of the two brake linings is assigned at least one locking element which is secured to the brake carrier and is supported, on the other hand, on the edge side of the brake lining which faces away from the base of the lining space. Alternatively, the locking element is attached to the brake carrier and engages in a positively locking fashion in the brake lining, in particular the lining carrier plate. In another configuration, the locking element engages over an edge region or an edge side of the lining carrier plate which faces away from the base of the lining space. It is decisive here that the locking element provides support and securement of the brake lining in the radial direction, counter to the insertion direction of the brake lining.

In one particular embodiment, a brake lining can advantageously be assigned two locking elements, wherein one of the two locking elements can be embodied in a rigid or movable fashion.

The locking element can be secured to the brake carrier in different ways, and likewise the configuration of the locking element can be different, depending on the requirements in terms of the use and the manufacture.

It is therefore possible for the locking element to be composed of a sheet metal strip which is dimensioned in terms of its thickness in such a way that its flexural rigidity is greater than the compressive force produced by the spring pressure.

Such a locking element can be secured in a positively locking fashion to the brake carrier, specifically on one side or both sides, i.e. by one end or by both ends. For the purpose of securement, a slot, into which the end of the strip-shaped locking element is plugged, is formed here in one or both of the brake carrier lugs.

For the sake of simpler mounting, the locking element can be connected in an articulated fashion to the lining carrier plate of the brake lining, preferably in a region which is adjacent to a brake carrier lug, while the other end engages in a cutout or an undercut or in the said slot in the brake carrier lug lying opposite, said slot running transversely with respect to the insertion direction of the brake lining.

Another variant of the locking element which is formed from a sheet metal strip is embodied as a hoop with two limbs connected to one another in the manner of a hinge and are each inserted by their free ends into the slots in the brake carrier lugs. For the purpose of flexurally rigid connection of the two limbs after mounting, the hinge is blocked, i.e. the two limbs can no longer be pivoted with respect to one another.

A brake lining for a disc brake, which lining has the lining carrier plate and the friction lining secured thereon, is embodied according to the invention in such a way that a separate dimensionally stable locking element is arranged on a side edge of the lining carrier plate. The lining carrier plate is usually contoured convexly on one side, wherein the at least one locking element is attached to this convexly shaped side edge of the lining carrier plate.

Further advantageous embodiments of the invention are characterized in the dependent claims.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
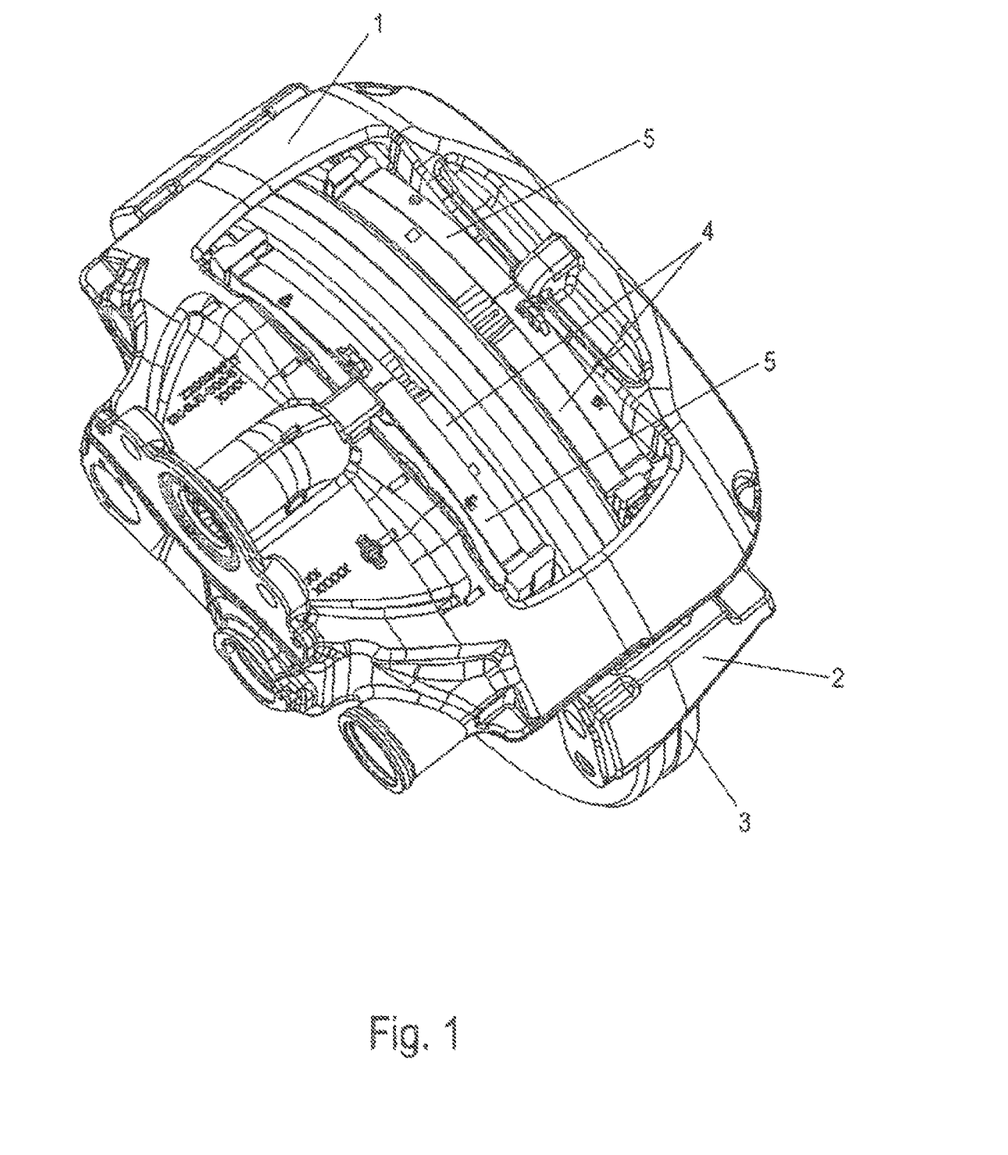
FIG. 1 shows a disc brake according to an embodiment of the invention in a perspective plan view.

FIG. 1 illustrates a disc brake, having a brake caliper 1 which engages over a vehicle-side brake disc 3 and which is attached to a positionally fixed brake carrier 2.

Figure 2:
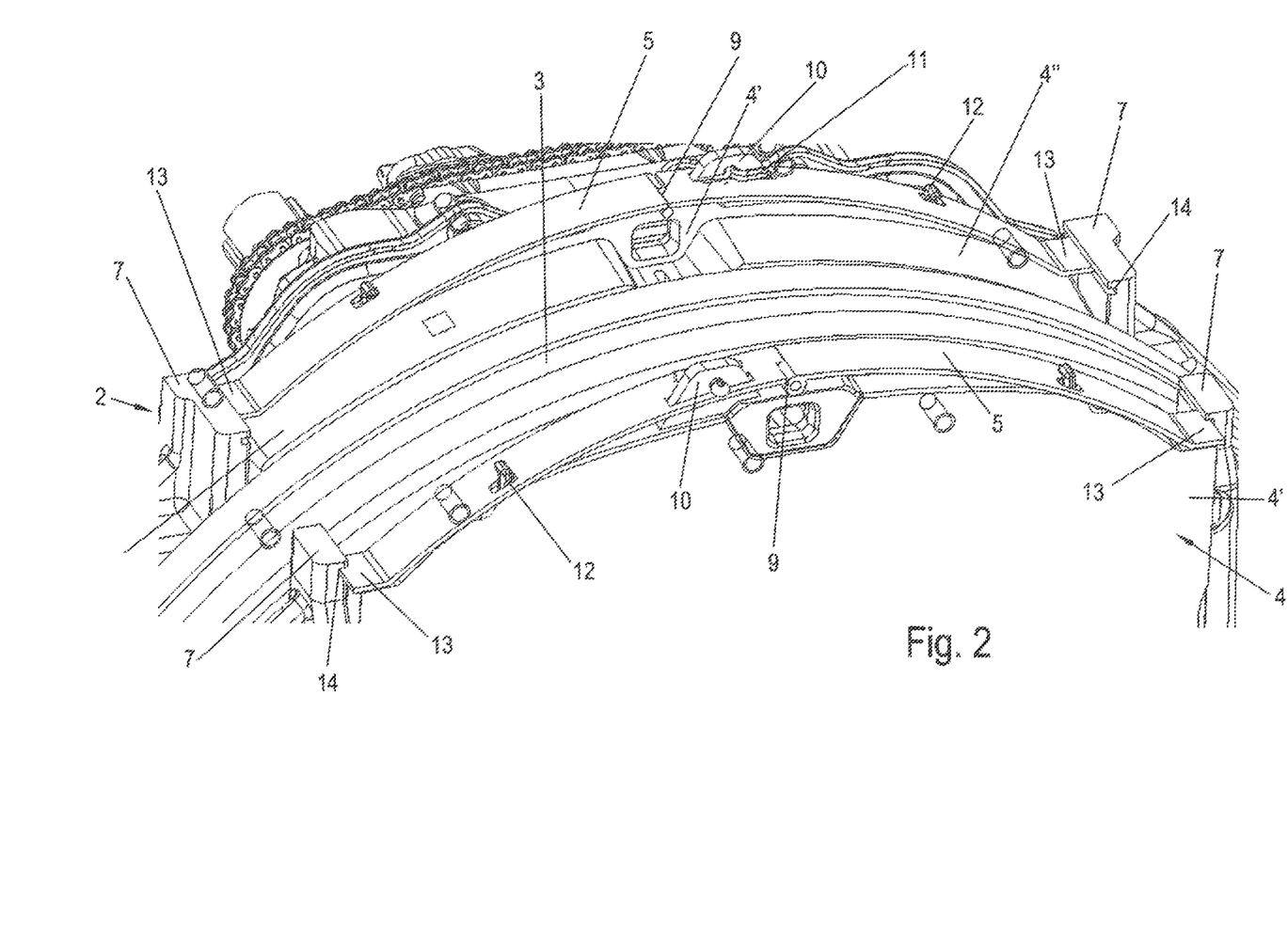
FIG. 2 shows part of the disc brake according to FIG. 1, also in a perspective view.
Figure 3:
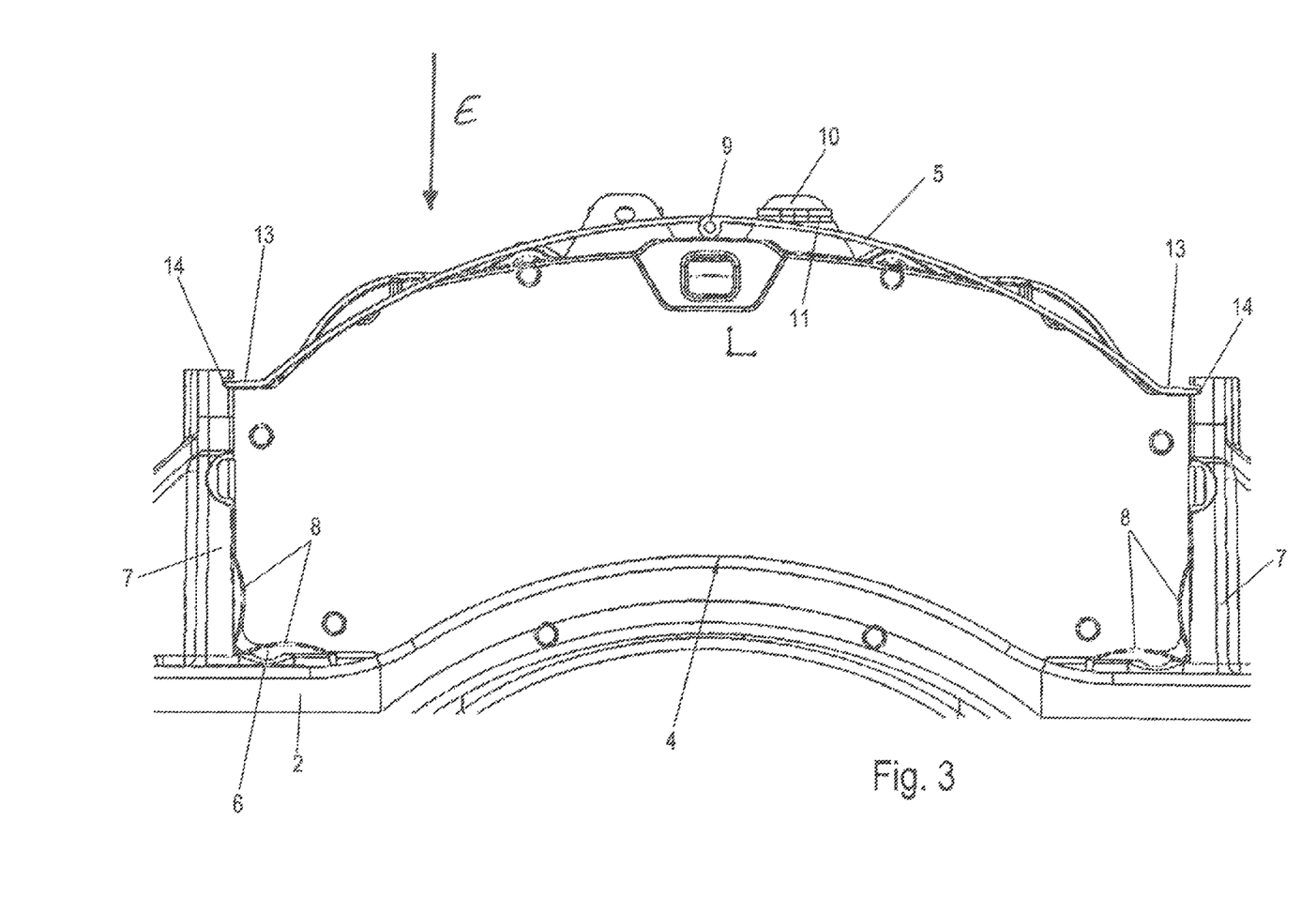
FIG. 3 shows a side view of the detail according to FIG. 2.

A brake lining 4, which has a lining carrier plate 4' and a friction lining 4" attached thereto, is provided on each side of the brake disc 3 and can be seen in a side view in FIG. 3, while the disc brake is represented without a brake caliper in FIG. 2.

Each brake lining 4 is arranged in a lining space 6 of the brake carrier 2 which is bounded in the circumferential direction of the brake disc 3 or in the longitudinal direction of the inserted brake lining 4 by brake carrier lugs 7. The brake carrier is embodied here in a frame-like fashion and preferably engages around an upper edge region of the brake disc 3 in a frame-like fashion. However, it can also be provided on one side of the brake disc 3. The other brake lining is then secured in the brake caliper (not illustrated here).

In the corners, lying opposite one another, of the lining space 6, spring elements 8 are arranged which are embodied as angular leaf springs in the example according to FIG. 3, wherein one limb bears on the base of the lining space 6, the other limb bears on the assigned brake carrier lug 7, and the brake lining 4 is supported on both limbs.

In an alternative embodiment (not illustrated in FIG. 1), the spring elements 8 are arranged on the brake lining 4 and secured thereto. In both variants, the spring elements 8 provide a tolerance compensation and prevent corrosion-induced blocking of the brake linings 4 in the lining shaft 6.

According to the embodiment of the invention shown in FIG. 1, dimensionally stable locking elements 5 are arranged as counter bearings on the sides lying opposite the spring elements 8, which locking elements 5 are supported on the lining carrier plates 4' of the brake linings 4 and are secured to the brake carrier 2. The dimensionally stable locking elements 5 are provided counter to an essentially radial insertion direction E of the brake linings 4 (see FIG. 3 in this respect).

In the example shown in FIGS. 1-3, the locking elements 5 are embodied as two-part hoops which are connected to one another in an articulated fashion approximately in the center region by a hinge 9, and have at the end side limb sections 13 which engage in slots 14, aligned axially with respect to the brake disc 3 and extending in the brake application direction, of the brake carrier lugs 7, with the result that positive engagement is brought about.

Using the hinge 9, it is possible to insert the limb sections 13 easily into the slots 14, since the shape of the locking element 5 can be correspondingly changed for this purpose. After the locking element 5 has been mounted and extended as far as into the slots 14, the hinge 9 is blocked, in the example by virtue of the fact that an eyelet 10, which is connected to the brake lining 4, passes through a slot in the locking element 5 and a pin 11 (such as a split pin) is subsequently guided through the opening of the eyelet 10, said pin 11 being secured by bending in such a way that it prevents slippage out of the eyelet 10.

Furthermore, barbs 12, which also pass through the hoop-like locking element 5 and thereby form an additional securing means, are integrally formed onto the brake linings 4.

Figure 4:
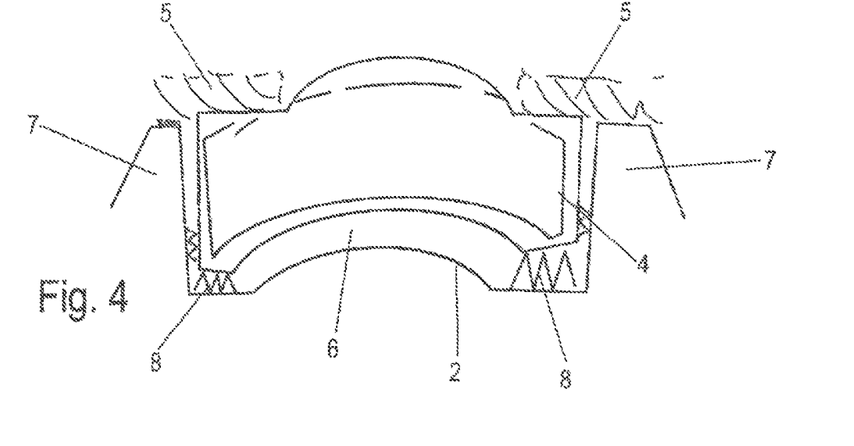
FIG. 4 shows another embodiment of the invention in a schematic side view.
Figure 5:
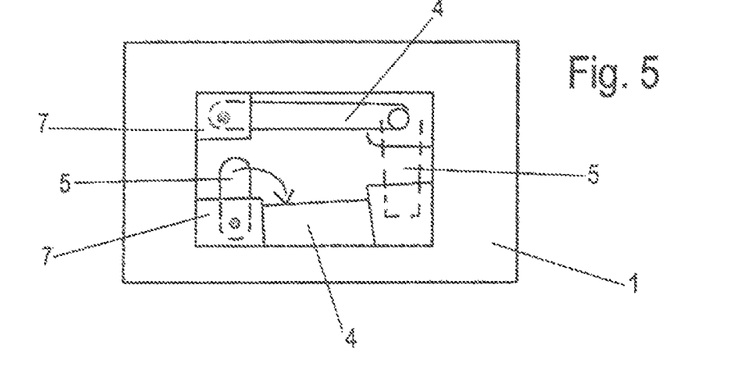
FIG. 5 shows the example embodiment of FIG. 4 in a schematic plan view.

In the embodiment shown in FIGS. 4 and 5 the locking element 5 is composed of a plate-shaped holder which is connected to the brake carrier lug 7 in a pivotable and lockable fashion and is rotated out of the insertion region in order to mount the brake lining 4, and after the mounting of the brake lining 4 is moved so as to overlap with the brake lining 4. The spring elements 8 which are arranged at the base of the lining shaft 6 press the brake lining 4 against the locking element 5. Instead of rotation with locking in the end position, the locking element 5 can also be screwed to the brake carrier lug 7. Two locking elements 5 which lie opposite one another can also optionally engage one in the other in the closed state.

Figure 6:
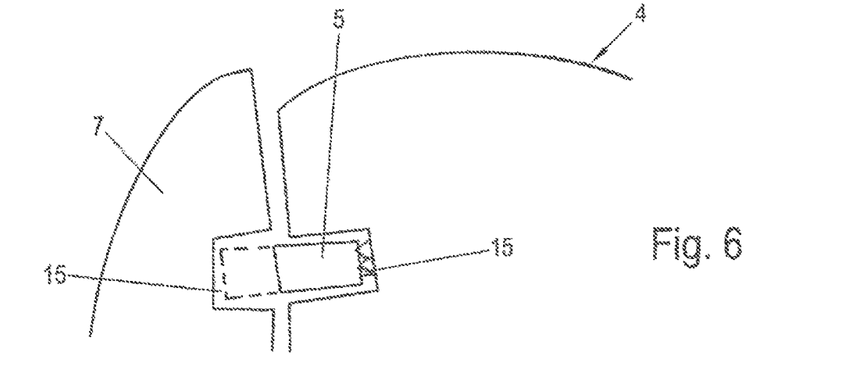
FIGS. 6-12 show further embodiments of the invention, each in a schematic side view.

Like the locking element 5 shown in FIGS. 4 and 5, the locking element which is represented in FIG. 6 is also embodied as a locking bolt, but here in such a way that it engages laterally in a cutout 15 in the brake carrier lug 7 and in a cutout 15 in the brake lining 4. Instead of rotation of the locking element 5 into a locking position or release position, it is also possible for a translatory movement to take place for this purpose, wherein the locking element 5 is secured in the locking position by a pin, splint, screw or a bolt.

In this context in one embodiment, the locking bolt is connected in a captive fashion to the brake lining 4, i.e. in an unlocked state the locking bolt is arranged inside the brake lining 4 or inside the cutout 15 in the brake lining 4. In an alternative embodiment, the locking bolt is connected captively to the brake carrier lug 7 or arranged within the cutout 15 in the brake carrier lug 7.

In an embodiment which is not illustrated, a compression spring which presses the locking bolt into the corresponding cutout 15 in order to radially support the brake lining 4 is arranged between the locking bolt and a rear wall of the cutout 15.

Figure 7:
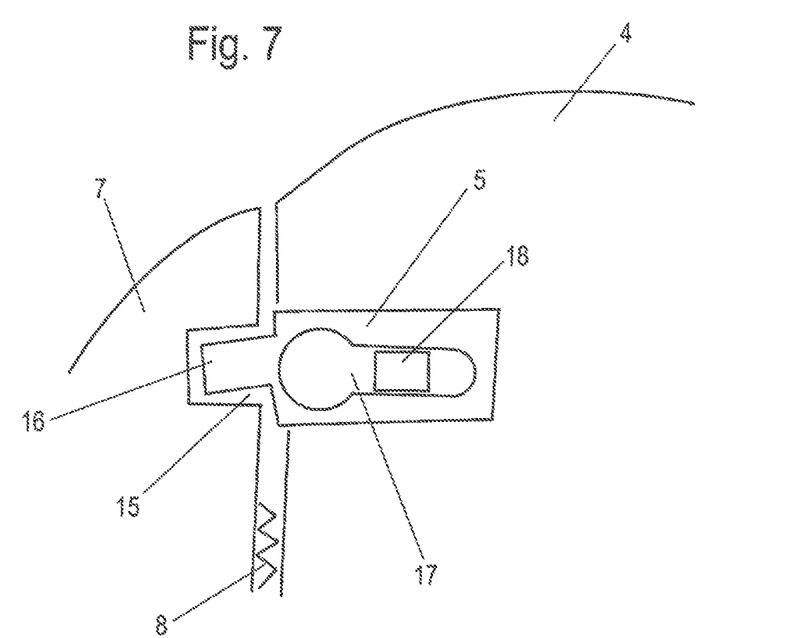

The locking element 5 is embodied in the example shown in FIG. 7 as a bolt pin 16 which engages functionally in the cutout 15 in the brake carrier lug 7. In this context, the bolt pin 16 is provided with a slotted link 17 in which a sliding block 18 is guided and is connected to the brake lining 4, wherein the bolt pin 16 can be displaced transversely with respect to the insertion direction E of the brake lining 4. In another embodiment variant, the sliding block 18 is rotatably connected to the brake lining 4, specifically to the rear side, facing away from the friction lining 4", of the lining carrier plate 4'.

In a further embodiment (not shown), the bolt pin 16 is embodied in such a way that it engages in a sliding block 18 which is arranged on the brake carrier lug 7. In this way, the radial support can, when formulated in a more general fashion, be provided both with a locking element 5 which acts from the brake lining 4 or the brake carrier plate 4' as well as with a locking element 5 which acts from the brake carrier lug 7.

The side of the brake lining which faces the brake carrier lug 7 advantageously has, in a partial region, a projection which is at least slightly larger than the thickness of the spring element 8, wherein the spring element 8 is arranged in the region outside the projection between the brake carrier lug 7 and the brake lining 4.

In the embodiment illustrated in FIG. 7, in the illustration the region above the bolt pin 16 protrudes compared to the region underneath the bolt pin 16, and the spring element 8 in the region which is then set back is arranged underneath the bolt pin 16. It is advantageous with this configuration of the brake linings 4 that the brake lining 4 comes to bear on the brake carrier lug 7 before the spring element 8 is pressed onto the block. The spring element 8 is therefore continuously supported.

Figure 8:
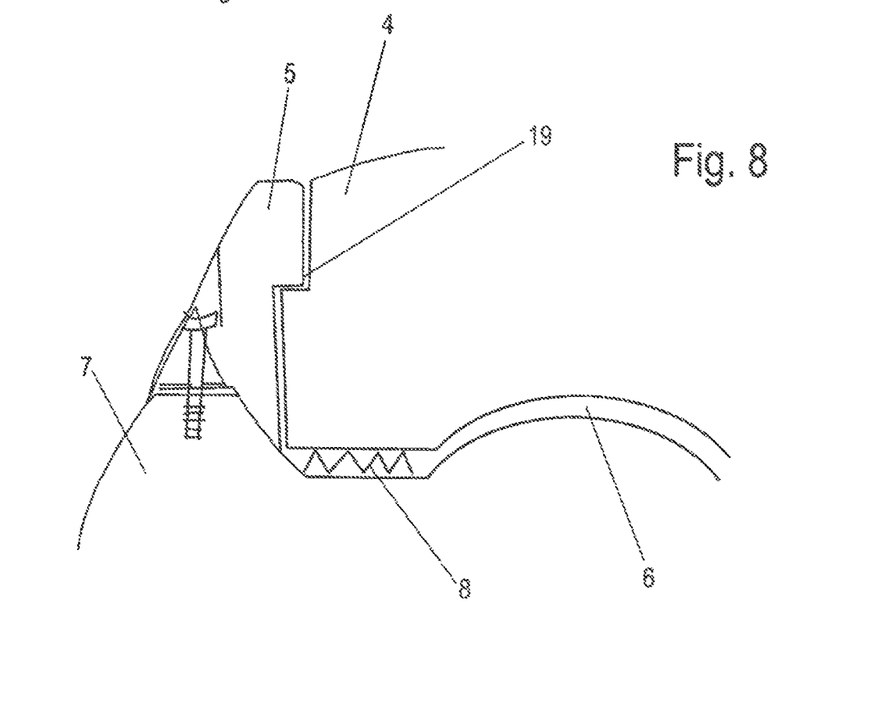

FIG. 8 illustrates an embodiment in which the locking element 5 is composed of part of the brake carrier lug 7 which is fitted onto the secured part of the brake carrier lug 7 and fixed there after the insertion of the brake lining 4 into the lining space 6. It is also conceivable for the brake carrier lug 7 or the locking element 5 to be configured in such a way that it can be folded down, wherein in each case the counter bearing function of the locking element 5 is performed by a stepped arrangement 19, which is provided, on the one hand, on the locking element 5, i.e. the corresponding parts of the brake carrier lug 7 and the brake lining 4. The stepped arrangement 19 generates, in the fixed state of the part of the lining carrier lug 7 which can be folded down or fitted on, an undercut into which the brake lining 4 or a nose or a projection of the brake lining 4 engages and therefore fixes or supports the brake lining 4 radially. When the mounted brake carrier lug 7 is, as illustrated in FIG. 8, basically capable of being folded down or fixed on, it is fixed or secured in position in the mounted position with a bolt, a screw or an alternative fixing element.

Figure 9:
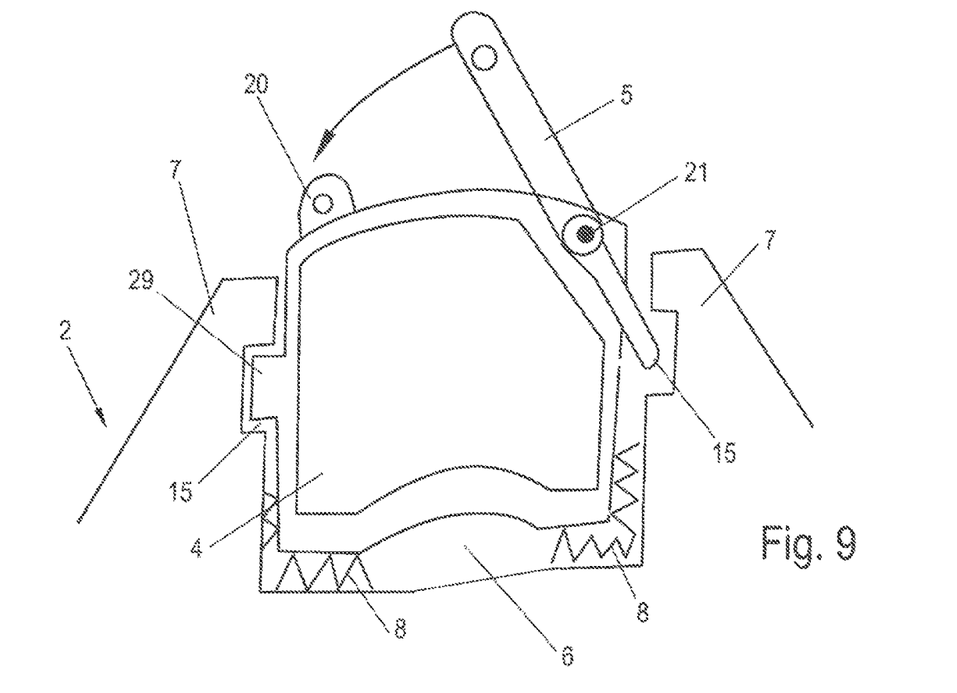

In FIG. 9, the two brake carrier lugs 7, which bound one of the lining shafts 6, have cutouts 15. A projection 29 of the brake lining 4, i.e. of the lining carrier plate, projects into one of these cutouts 15, while the locking element 5 is formed by a lever which is pivotably secured to the brake lining 4 and engages in the locked position with one end in the other cutout 15 and thereby forms a radial fixing means of the brake lining 4. In this case, the brake lining 4 is pressed with its projection 29 into the assigned recess 15. FIG. 9 shows here the basic principle, whereby the configuration and the dimensions of the pivotably secured lever are to be adapted to the geometry which is present and the definition of the functional problem.

In the embodiment shown, a spring element 8 or a sliding plate is arranged on the side of the brake lining 4 with the projection 29, between the brake carrier lug 7 and the brake lining 4. The brake lining 4 can therefore advantageously be prevented from rusting tight and/or jamming.

The brake lining 4 is therefore inserted into the lining space 6 until it rests against the spring elements 8 positioned on the base of the lining space 6, and by pivoting the locking element 5 the brake lining 4 is pressed into the abovementioned position and secured therein.

In order to pivot the locking element 5, it is secured to a rotational axis 21 of the brake lining 4, while the brake lining 4 has a clip 20 on which the locking element 5 can be securely held in its functional end position, for example by a splint, a screw or the like.

In one advantageous exemplary embodiment, a corrosion-resistant bolt or a corrosion-resistant sliding shoe or a corrosion-resistant metal sheet which acts as a sliding shoe is arranged at the end of the lever.

Figure 10:
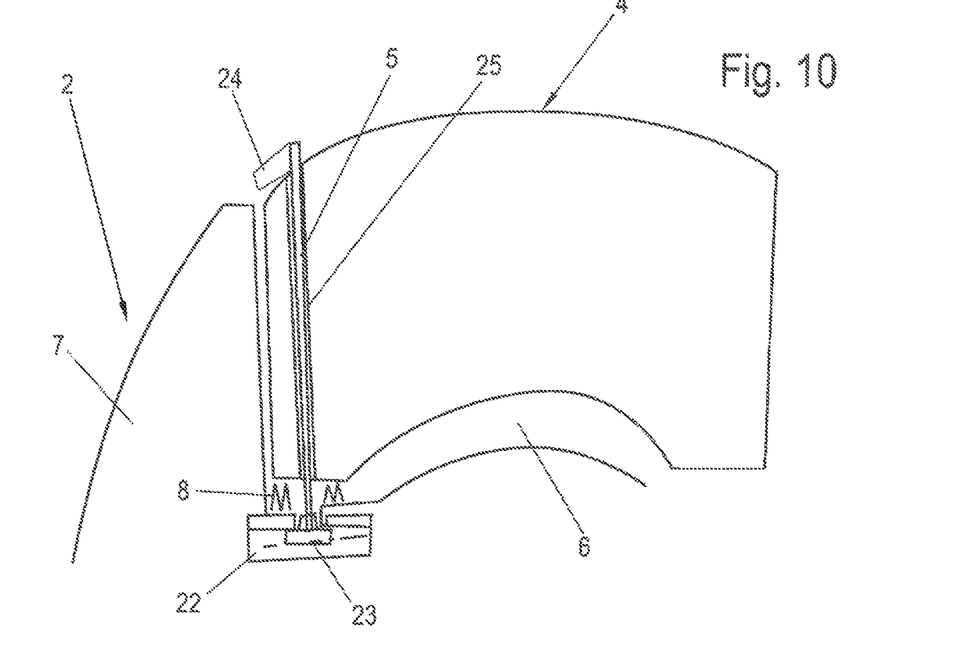

FIG. 10 shows a brake lining 4 in the lining carrier plate of which a drilled hole 25 or a groove is formed, through which the rod-shaped locking element 5 is inserted, said rod-shaped locking element 5 having at the end side a T element 23 which is secured in a positively locking fashion in a T groove of the brake carrier 2, while the opposite end is provided with the securing element 24, for example a screwed-on nut or the like.

Figure 11:
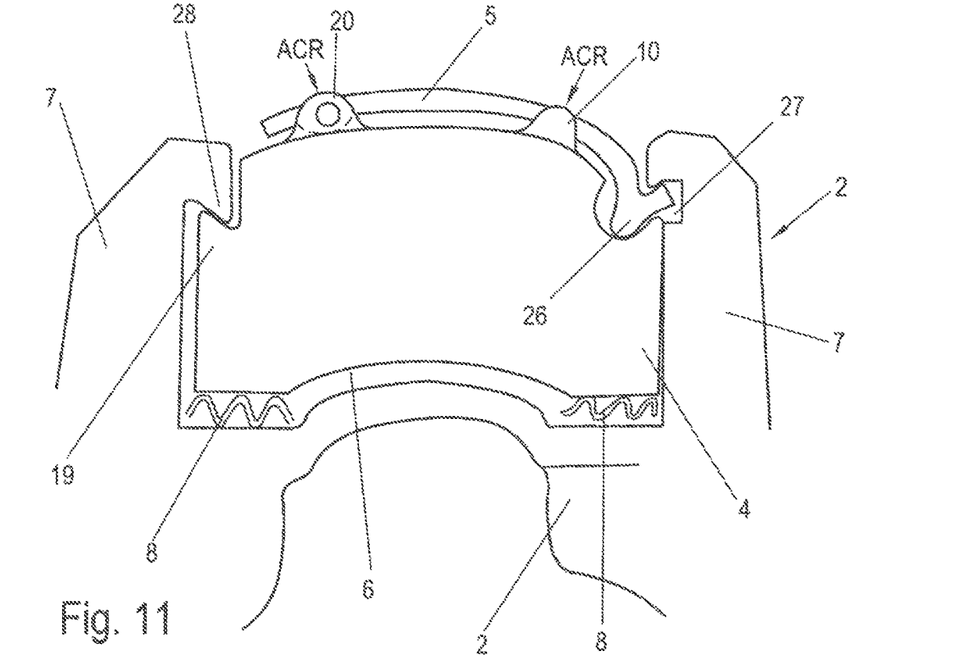

In FIG. 11, the locking element 5 is embodied as a lever and is pivotably secured to the brake lining 4, wherein a free end of the locking element 5 is configured as an angular section 26 which engages in a recess 27 in the adjacent brake carrier lug 7.

In a further variant, the lever can be embodied as a toggle lever which is arranged, for geometric reasons, in its end position, on each side of a dead center, as a result of which self-locking of the locking element 5 occurs.

Lying opposite, a step 19 of the brake lining 4 is supported on a nose 28 of the assigned brake carrier lug 7, wherein this nose 28 forms, like the angular section 26, together with the recess 27, a counter bearing on which the brake lining 4 which is under spring pressure of the spring elements 8 is supported. In this context, the spring elements 8 are positioned on the base of the lining shaft 6.

Figure 12:
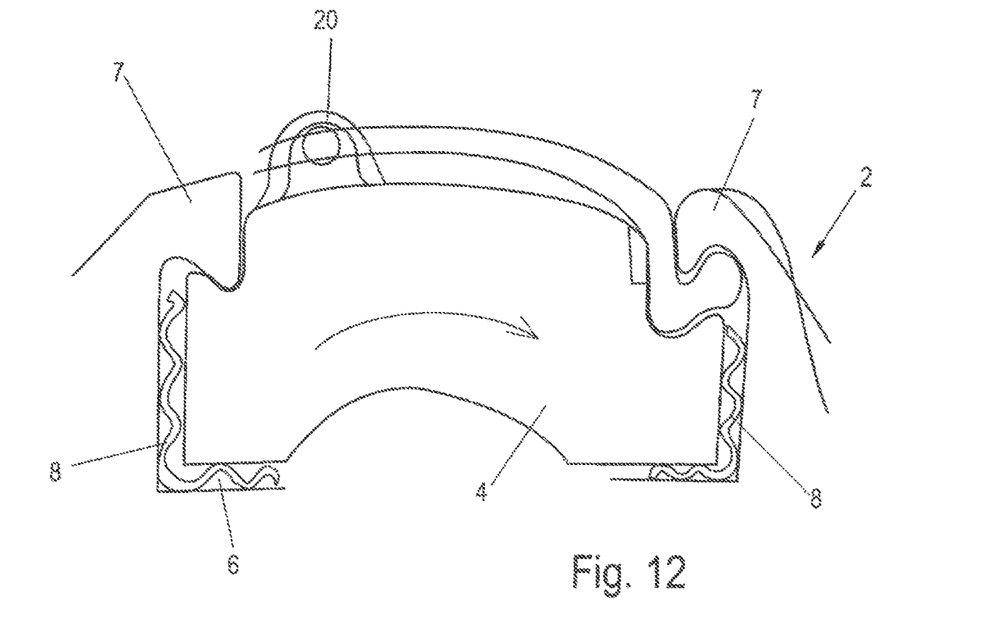

In FIG. 12, an embodiment variant is illustrated which corresponds essentially to that in FIG. 11. Only the spring elements 8 are configured in an angular shape here, i.e. they bear both on the base of the lining shaft 6 as well as on the side faces, bent with respect thereto, of the brake carrier lugs 7.

Figure 13:
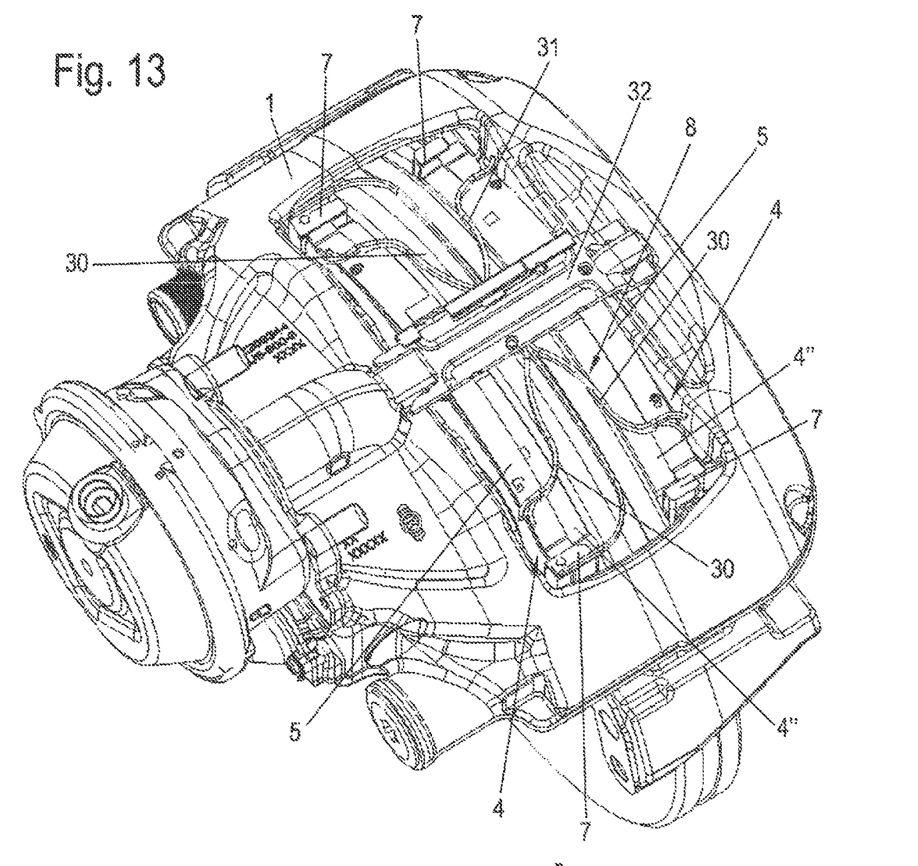
FIG. 13 shows an embodiment of the disc brake according to the invention in a perspective plan view.

FIG. 13 shows a disc brake according to the invention in which the spring element 8 rests on the locking elements 5 of the two brake linings 4, wherein the spring element 8 is formed in an X shape, with spring limbs 30 which rest on the locking elements 5 and are supported on the lining carrier plates 4'.

In this context, the spring element 8 is essentially axis-symmetrical with respect to an axis-parallel first mirror axis as well as with respect to a second mirror axis in a plane of extent of the brake disc 3.

The spring element 8 is arranged centrally above the brake disc 3, wherein a spring force of the brake disc 3 acts outward and presses the brake linings 4 away from the brake disc 3 after a braking process, with the result that in the unactuated state the disc brake is free of braking torque, i.e. a residual slipping torque is reduced or completely eliminated.

A further spring force component acts in the circumferential direction, i.e. in the longitudinal direction, on the locking elements 5, as a result of which influences of wear, corrosion and soiling can advantageously be kept at least small.

A securing hoop 32 which can be seen in FIG. 13 can optionally be provided. In this context, the spring element 8 is supported on the securing hoop 32 and is centered above the brake disc 3.

The spring element 8 has in the example a two-armed spring hoop 31 which is arranged between the spring limbs 30, extends in the circumferential direction of the brake disc 3 and is attached to the brake carrier lugs 7 which bound the action-side lining shaft 6. The spring hoop 31 brings about simple centering of the spring element 8 above the brake disc 3. Alternatively, the spring element 8 automatically centers itself between the two brake linings 4 by reaction forces of the spring element 8 which act on the brake linings 4.

Figure 14:
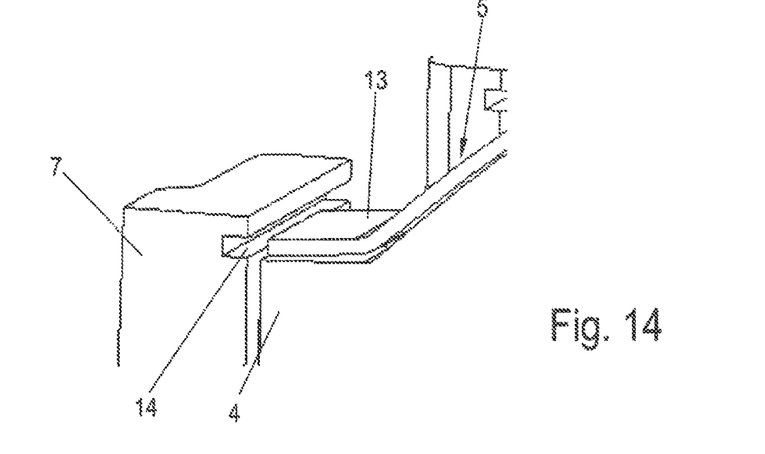
FIG. 14 shows a partial cutout of an embodiment of the disc brake of the invention in a perspective view.

FIG. 14 shows a detail of the embodiment which has already been described in FIGS. 1 to 3. In this context, the locking element 5 is illustrated in the released position. In one embodiment, the locking element 5 is a rigid lever with a hinge 9 which is arranged centrally. The locking element 5 extends longitudinally over the brake lining 4 and is held mechanically by the latter, wherein the locking element 5 can be raised in the region of the hinge 9 (not illustrated in FIG. 14) in order to release the locking element 5 from the slot 14 formed in the brake carrier lug 7. In the second position, the locking element 5 is, as illustrated in FIG. 15, lowered in the region of the hinge 9 in the direction of the brake lining 4, as a result of which the locking element projects out tangentially over the brake lining 4 and engages in the slot 14 which is formed in the brake carrier lug.

The locking element 5 can be secured in the closed state. In the embodiment illustrated in FIG. 15, the pin 11 is plugged through the eyelet 10 which is formed in the lining carrier plate 4', and the locking element 5 is therefore fixed or secured in its position.

Figure 15:
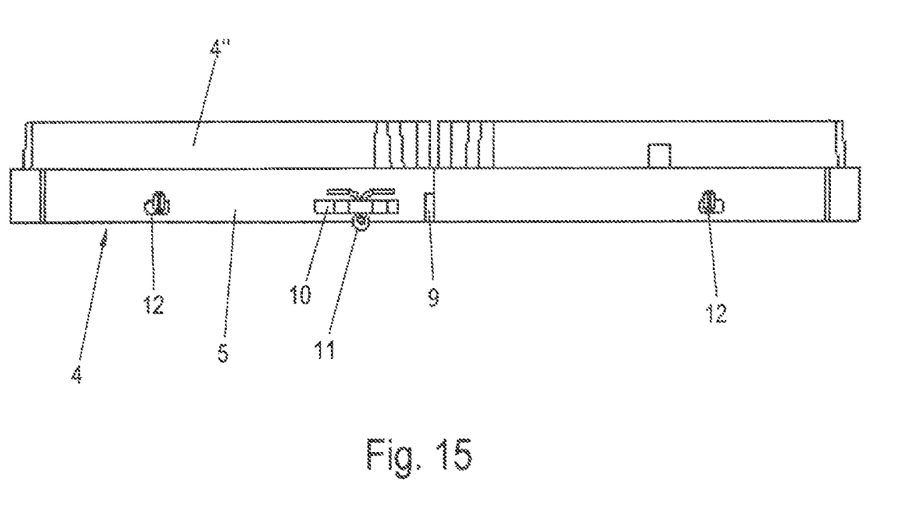
FIG. 15 shows an embodiment of the brake lining according to the invention in a plan view.

In FIG. 15, a brake lining 4 according to the invention is also illustrated, wherein this brake lining 4 has the lining carrier plate 4' and the friction lining 4" which is secured thereto. The dimensionally stable locking element 5 is connected to a side edge of the lining carrier plate 4' as a separate component.

The described device of the locking element or elements 5 with the brake carrier lugs corresponds also to the connection with which the locking element or elements of the brake lining 4 is provided on the brake caliper 1 if one of the two brake linings 4 is arranged in the brake carrier and the other is arranged on the opposite side of the brake disc 3 to the brake carrier 4, in the brake caliper 1.

Figure 16:
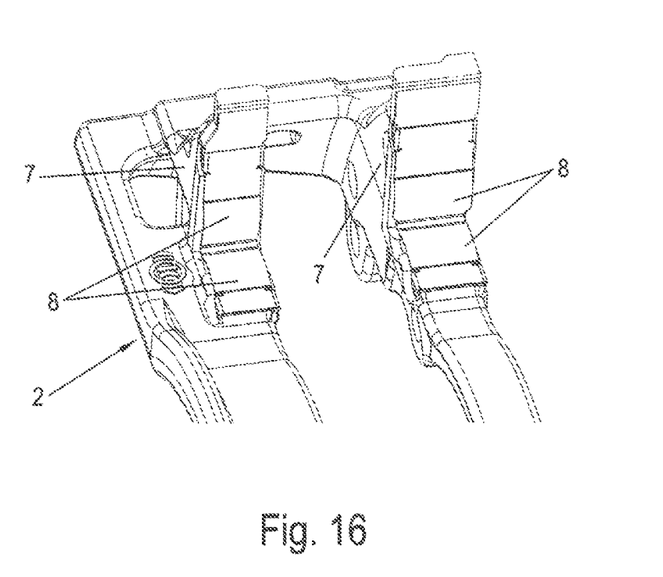
FIG. 16 shows a partial cutout of an embodiment of a brake carrier of the invention, likewise illustrated in perspective.

Spring elements 8 which are each embodied as leaf springs are arranged on the brake carrier lugs 7 which are illustrated in FIG. 16 and they make available, in the radial and tangential directions, tolerance compensation for play between the brake carrier lug 7 and a brake lining 4 which is inserted. The spring element 8 also advantageously acts in a wear-reducing fashion and corrosion-protective fashion by virtue of the material selected for it.

A width of the brake carrier lugs 7 in one exemplary embodiment advantageously corresponds to a lining shaft width, in particular in a tolerance range around 248 mm.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Brake caliper
2 Brake carrier
3 Brake disc
4 Brake lining
5 Locking element
6 Lining space
7 Brake carrier lug
8 Spring element
9 Hinge
10 Eyelet
11 Pin
12 Barb
13 Limb section
14 Slot
15 Cutout
16 Bolt pin
17 Slotted link
18 Sliding block
19 Step
20 Clip
21 Rotational axis
22 T groove
23 T element
24 Securing element 25 Drilled hole
26 Angular section
27 Recess
28 Nose
29 Projection
30 Spring arm
31 Spring hoop
32 Securing hoop
E Insertion direction

What is claimed is:

1. A disc brake for a utility vehicle, comprising:
a brake caliper configured to engage over a vehicle brake disc and be secured to a positionally fixed brake carrier, wherein the brake carrier has at least one lining space bounded by lateral brake carrier lugs,
a brake lining associated with each of the at least one lining spaces, each brake lining being configured to be inserted into the respective one of the at least one lining spaces in an insertion direction, and
a locking element associated with each brake lining, the locking element being dimensionally stable when in an installed position in the disc brake, is arranged as a counter bearing in the opposite direction to the insertion direction of the brake lining,
wherein
each locking element is supported on the respective brake lining or the brake carrier and is secured to the brake carrier or to the respective brake lining,
the lateral brake carrier lugs include at least one recess facing the at least one lining space into which the locking element is engaged,
the locking element is a bolt pin having a slotted link arrangement in which a sliding block is guided,
the bolt pin is secured to a lining carrier plate of the brake lining and is configured to engage in a recess in the brake carrier lug, and
the bolt pin is mounted in at least one of a displaceable and a rotatable manner in a plane parallel to a rotation axis of the brake disc.

2. The disc brake according to claim 1, wherein
each locking element is held in a positively or frictionally locking manner on at least one of the brake carrier and the respective brake lining.

3. The disc brake according to claim 1, wherein
the brake carrier lugs have slots which extend in a brake application direction configured to receive a limb section of the locking element.

4. The disc brake according to claim 3, wherein
two of the locking elements are associated with each brake lining, and
the two locking elements are held on the brake carrier lugs in a rotationally secured and lockable manner.

5. The disc brake according to claim 1, wherein
at least one spacer element is arranged between the respective brake lining and a brake carrier surface defining the brake lining space.

6. The disc brake according to claim 5, wherein
the at least one spacer element is at least one of a spring element, a sliding plate, and a bolt.

7. The disc brake according to claim 1, wherein
the at least one brake lining space includes two brake lining spaces on opposite sides of the brake disc of the disc brake,
the brake lining associated with a first one of the two brake lining spaces is arranged in the first one of the two brake lining spaces, and
the brake lining associated with a second one of the two brake lining spaces is supported on the brake caliper.

8. A disc brake for a utility vehicle comprising:
a brake caliper configured to engage over a vehicle brake disc and be secured to a positionally fixed brake carrier, the brake carrier having at least one lining space bounded by lateral brake carrier lugs,
a brake lining associated with each of the at least one lining spaces, each brake lining being configured to be inserted into the respective one of the at least one lining spaces in an insertion direction,
a locking element associated with each brake lining, the locking element being dimensionally stable when in an installed position in the disc brake, is arranged as a counter bearing in the opposite direction to the insertion direction of the brake lining,
wherein
each locking element is supported on the respective brake lining or the brake carrier and is secured to the brake carrier or to the respective brake lining,
the lateral brake carrier lugs include at least one recess facing the at least one lining space into which the locking element is engaged, and
each locking element is a flexurally rigid, hoop shaped sheet metal strip configured to extend between opposing ones of the brake carrier lugs on a side of the brake lining facing away from a rotation axis of the brake disc, such that two ends of the at least one locking element each engage in one of the opposing ones of the brake carrier lugs in a positively locking manner.

9. The disc brake according to claim 8, wherein
each locking element includes two limbs connected by a non-elastic hinge.

10. The disc brake according to claim 9, wherein
each locking element is configured to be secured to the respective brake lining.

11. A disc brake for a utility vehicle, comprising:
a brake caliper configured to engage over a vehicle brake disc and be secured to a positionally fixed brake carrier, wherein the brake carrier has at least one lining space bounded by lateral brake carrier lugs,
a brake lining associated with each of the at least one lining spaces, each brake lining being configured to be inserted into the respective one of the at least one lining spaces in an insertion direction, and
a locking element associated with each brake lining, the locking element being dimensionally stable when in an installed position in the disc brake, is arranged as a counter bearing in the opposite direction to the insertion direction of the brake lining,
wherein
each locking element is supported on the respective brake lining or the brake carrier and is secured to the brake carrier or to the respective brake lining,
the lateral brake carrier lugs include at least one recess facing the at least one lining space into which the locking element is engaged,
each locking element includes a locking bolt configured to be located a cutout in at least one of one of the brake carrier lugs and the respective brake lining, and
the locking bolt is held in the cutout in a linear or pivotable manner in a plane parallel to a rotation axis of the brake disc.

12. A disc brake for a utility vehicle, comprising:
a brake caliper configured to engage over a vehicle brake disc and be secured to a positionally fixed brake carrier, wherein the brake carrier has at least one lining space bounded by lateral brake carrier lugs,
a brake lining associated with each of the at least one lining spaces, each brake lining being configured to be inserted into the respective one of the at least one lining spaces in an insertion direction, and
a locking element associated with each brake lining, the locking element being dimensionally stable when in an installed position in the disc brake, is arranged as a counter bearing in the opposite direction to the insertion direction of the brake lining,
   each locking element is supported on the respective brake lining or the brake carrier and is secured to the brake carrier or to the respective brake lining,
   the lateral brake carrier lugs include at least one recess facing the at least one lining space into which the locking element is engaged,
   the locking element is a two armed lever configured to be pivotably secured to the brake lining, the locking element having at a first end configured to project into a cutout of one of the brake carrier lugs, and at a second end being configured to be secured to the respective brake lining, and
   a projection of the brake lining engages in a cutout in the other of the brake carrier lugs.

13. A disc brake for a utility vehicle, comprising:
a brake caliper configured to engage over a vehicle brake disc and be secured to a positionally fixed brake carrier, wherein the brake carrier has at least one lining space bounded by lateral brake carrier lugs,
a brake lining associated with each of the at least one lining spaces, each brake lining being configured to be inserted into the respective one of the at least one lining spaces in an insertion direction, and
a locking element associated with each brake lining, the locking element being dimensionally stable when in an installed position in the disc brake, is arranged as a counter bearing in the opposite direction to the insertion direction of the brake lining,
wherein
   each locking element is supported on the respective brake lining or the brake carrier and is secured to the brake carrier or to the respective brake lining,
   the lateral brake carrier lugs include at least one recess facing the at least one lining space into which the locking element is engaged, and
   the locking element is a rod configured to be guided through the brake lining (4), the locking element having a T-shaped first end configured to engage a corresponding T-shaped groove at the base of the lining space of the brake carrier, and a second end having a securing element which bears against the brake lining.

14. A disc brake for a utility vehicle, comprising:
a brake caliper configured to engage over a vehicle brake disc and be secured to a positionally fixed brake carrier, wherein the brake carrier has at least one lining space bounded by lateral brake carrier lugs,
a brake lining associated with each of the at least one lining spaces, each brake lining being configured to be inserted into the respective one of the at least one lining spaces in an insertion direction, and
a locking element associated with each brake lining, the locking element being dimensionally stable when in an installed position in the disc brake, is arranged as a counter bearing in the opposite direction to the insertion direction of the brake lining,
   each locking element is supported on the respective brake lining or the brake carrier and is secured to the brake carrier or to the respective brake lining,
   the lateral brake carrier lugs include at least one recess facing the at least one lining space into which the locking element is engaged,
   the locking element is a toggle lever rotatably secured on the respective brake lining, the locking element having a first free end with an angular section configured to engage in a recess in one of the brake carrier lugs, and
   at an end of the respective brake lining opposite an end adjacent to the first free end of the locking element, the respective brake lining has a step configured to be supported on a nose of the other of the brake carrier lugs.

\* \* \* \* \*